United States Patent
de la Borbolla

(10) Patent No.: US 6,664,467 B1
(45) Date of Patent: Dec. 16, 2003

(54) RACEWAY NON-METALLIC OVERLAPPING FACEPLATE MOUNTING BRACKET

(75) Inventor: Ian Rubin de la Borbolla, Memphis, TN (US)

(73) Assignee: Thomas & Betts INternational, Inc., Sparks, NV (US)

( * ) Notice: Subject to any disclaimer, the term of this patent is extended or adjusted under 35 U.S.C. 154(b) by 0 days.

(21) Appl. No.: 10/407,474

(22) Filed: Apr. 4, 2003

(51) Int. Cl.[7] ............................................... H02G 3/04
(52) U.S. Cl. ..................... 174/48; 174/49; 174/68.3; 52/220.7
(58) Field of Search .................. 174/48, 49, 53, 174/68.3, 101; 52/220.2, 220.7; 220/3.8

(56) References Cited

U.S. PATENT DOCUMENTS

| | | | |
|---|---|---|---|
| 4,017,137 A | 4/1977 | Parks | 339/21 |
| 4,255,610 A * | 3/1981 | Textoris | 174/48 |
| 4,800,237 A * | 1/1989 | Mohr | 174/48 |
| 4,952,163 A | 8/1990 | Dola et al. | 439/211 |
| 5,336,849 A | 8/1994 | Whitney | 174/48 |
| 5,594,205 A | 1/1997 | Cancellieri et al. | 174/53 |
| 5,614,695 A | 3/1997 | Benito Navazo | 174/48 |
| 5,670,743 A | 9/1997 | Welch et al. | 174/49 |
| 5,744,750 A | 4/1998 | Almond | 174/49 |
| 5,831,211 A * | 11/1998 | Gartung et al. | 174/48 |
| 5,861,576 A | 1/1999 | Langston et al. | 174/48 |
| 5,863,016 A | 1/1999 | Makwinski et al. | 248/27.1 |
| 5,942,724 A | 8/1999 | Russo et al. | 174/48 |
| 5,957,414 A | 9/1999 | Perrignon de Troyes et al. | 248/27.1 |
| 6,072,121 A * | 6/2000 | Penczak et al. | 174/48 |
| 6,259,020 B1 | 7/2001 | Ashline et al. | 174/48 |
| D448,350 S | 9/2001 | Bentz et al. | D13/152 |
| 6,323,421 B1 | 11/2001 | Pawson et al. | 174/48 |
| 6,342,675 B1 | 1/2002 | DeBartolo, Jr. et al. | 174/50 |
| 6,355,880 B1 | 3/2002 | Bateson et al. | 174/48 |
| 6,362,420 B1 | 3/2002 | Bacouelle et al. | 174/48 |
| 6,437,247 B1 * | 8/2002 | Holliday | 174/101 |

* cited by examiner

*Primary Examiner*—Dhiru R Patel
(74) *Attorney, Agent, or Firm*—Michael L. Hoelter; G. Andrew Barger

(57) ABSTRACT

A surface raceway mounting bracket is described which is used to secure an electrical fixture to the surface raceway. The mounting bracket is supported by the surface raceway and it is configured with at least one latch extending from the back surface of the mounting bracket. Each such latch is configured to engage and latch onto the base component of the surface raceway. A perimeter portion of this mounting bracket is designed to overlay a portion of the cover of this surface raceway.

15 Claims, 4 Drawing Sheets

RACEWAY NON-METALLIC OVERLAPPING FACEPLATE MOUNTING BRACKET

FIELD OF THE INVENTION

This invention pertains, in general, to surface raceway which is used to support wire or cable runs and more particularly to a snap-on mounting bracket used when mounting an electrical fixture, such as a duplex electrical outlet, a data communications jack or a phone jack, to the surface raceway.

BACKGROUND OF THE INVENTION

Surface raceway is often used along the outside of walls when there is a need to extend or run electrical wires or cables. It is considerably cheaper and quicker to run the wires in this fashion than to try to run them within the walls of the structure after the structure has been built. Surface raceway also protects the wiring from unwanted or undesirable exposure yet it is designed so that additional wiring can be quickly added at some future date. Furthermore, surface raceway is designed so that the wiring therein can be easily accessed from almost any location along the run should the need arise. One common reason for accessing the wiring within a surface raceway is to install electrical fixtures, such as duplex outlets, data communication jacks or phone jacks, along the raceway. However, to do so, a special device called a mounting bracket is needed.

Mounting brackets provide a means of securing the electrical fixture to the surface raceway so that the fixture can be connected to the wires within. Mounting brackets also provide a means of covering the opening made in the surface raceway as well as conceal the cut edges of the raceway cover so that these sharp edges and the wiring therein will not be exposed. This covering function also aids in the installation of the surface raceway since the now covered cut edges or ends of the raceway cover will not be visible and hence need not be perfect. Thus, an installer's rough, angled, or slightly off cut of the raceway cover will not show which makes the installer's job easier since less attention is required for each such cut.

As can be imagined, mounting brackets for surface raceway are well known in the art. See, for example, U.S. Pat. No. 6,259,020, U.S. Pat. No. 6,362,420, U.S. Pat. No. 5,614,695, U.S. Pat. No. 5,957,414 and U.S. Pat. No. 6,323,421. Each of these examples disclose a mounting bracket used to secure an electrical fixture to the surface raceway. While these various devices may be sufficient for their intended purpose, each such mounting bracket requires multiple components for installation in addition to the face plate surrounding the electrical fixture itself. Such a need for multiple components creates the opportunity that these components may become lost thus rendering the mounting bracket inoperable. Also, if the mounting bracket is installed with a part missing, a dangerous and unsafe situation may result.

A further issue with existing mounting brackets is the fact that once mounted, most cannot be easily removed should the need arise. For example, during the raceway cover trimming operation, it is desirable for the mounting bracket to be temporarily secured in place so that the cover can be properly marked as to where it is to be cut. This is more difficult to accomplish if the user, at the same time as marking the cover, also has to hold the mounting bracket in place. It is also desirable for the mounting bracket to be removable in the event there are visual issues with the installation or if it is determined that additional adjustment or trimming is required prior to final assembly.

It is thus an object of this invention to provide a surface raceway mounting bracket that consists of a single component and not of multiple components as have hampered earlier such products. This single component feature eliminates the possibility that a missing part will render the bracket unusable.

It is yet another object of this invention to provide a novel manner of attachment of the bracket to the surface raceway in order to allow the bracket to be removable during installation. This aids the installation of the bracket onto the surface raceway since the bracket can be removed should any additional trimming or cutting of the surface raceway cover be required.

Yet another object of this invention is to provide a unique method of final securement of the mounting bracket to the raceway, one which does not require any tooling or screws, yet adequately secures the bracket to the raceway.

Still another object of this invention is to provide a mounting bracket that will cover any rough edges of the surface raceway covering that may occur when the raceway cover is trimmed to fit. Another object of this invention is to provide a means of securing a variety of different face plates to the mounting bracket depending on the electrical fixture installed.

These and other objects and advantages of this invention will become evident upon further investigation.

SUMMARY OF THE INVENTION

This invention pertains to an assembly for mounting an electrical fixture to a surface raceway with this surface raceway having both base and cover components. The invention comprises a mounting bracket having front and back surfaces and which is also configured to support an electrical fixture therein. At least one latch extends from the back surface of the mounting bracket with each such latch being configured to engage and latch onto the base component of the surface raceway. This mounting bracket is also designed and configured to overlay or conceal a portion of the cover component.

DETAILED DESCRIPTION OF THE DRAWINGS

Figure 1:
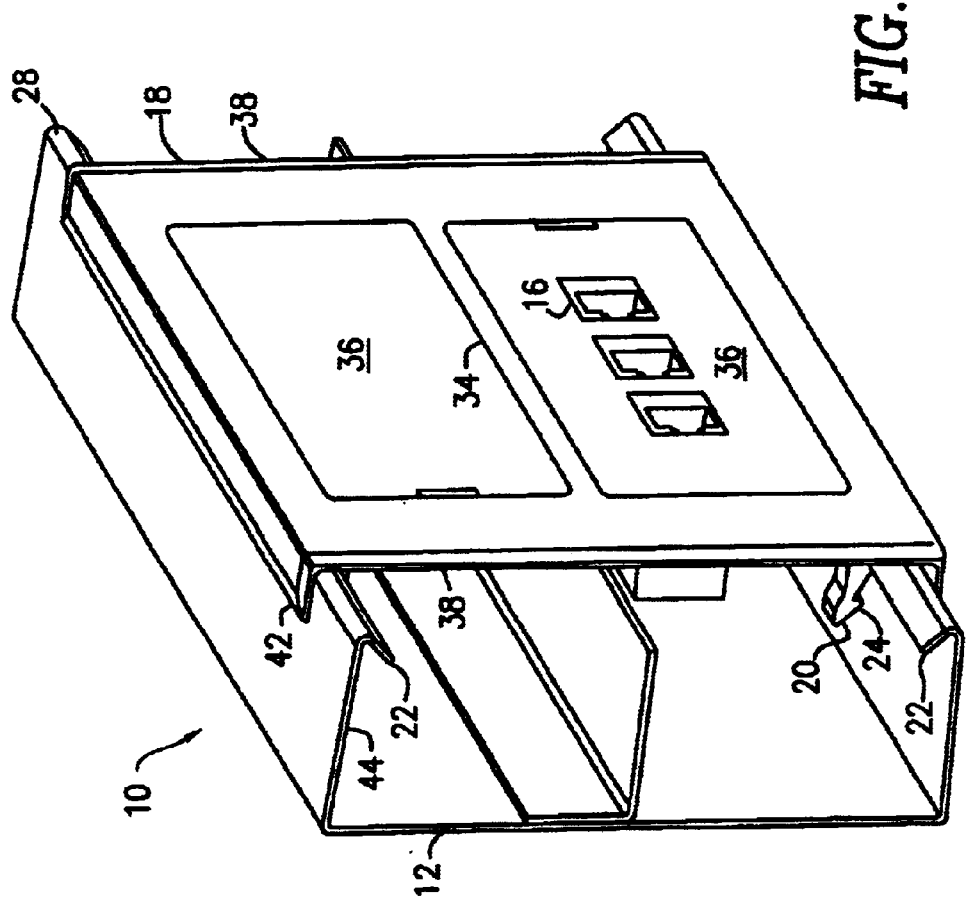
FIG. 1 is a perspective view of the invention in its assembled state showing its attachment to a surface raceway (with the surface raceway covering removed for clarity).

Referring to the drawings, there is shown surface raceway 10 which is generally secured to the surface of an interior wall or the like. Surface raceway 10 consists of a generally U-shaped base 12 and removable cover 14. In some instances surface raceway 10 includes one or more dividers therein to, for example, separate power or high voltage wiring from communication or low voltage wiring. Special fittings are provided, depending on the shape of raceway 10, to enable it to extend around corners or join at intersections (such as a T intersection).

Oftentimes, along the run of raceway 10, it is desired to install an electrical fixture 16 such as a duplex or power outlet, a data communications jack, a phone jack or the like. This is accomplished by removing and trimming cover 14 so as to provide an opening in which to receive this fixture 16. In many instances, electrical fixture 16 will be located at a junction or splice between adjacent covers 14 so that one or both covers 14 will be reduced in length (i.e. cut) sufficient enough to accommodate fixture 16 within or along raceway 10. Regardless of the method used, to aid in this endeavor, mounting bracket 18 is utilized to secure electrical fixture 16 to surface raceway 10.

Figure 4:
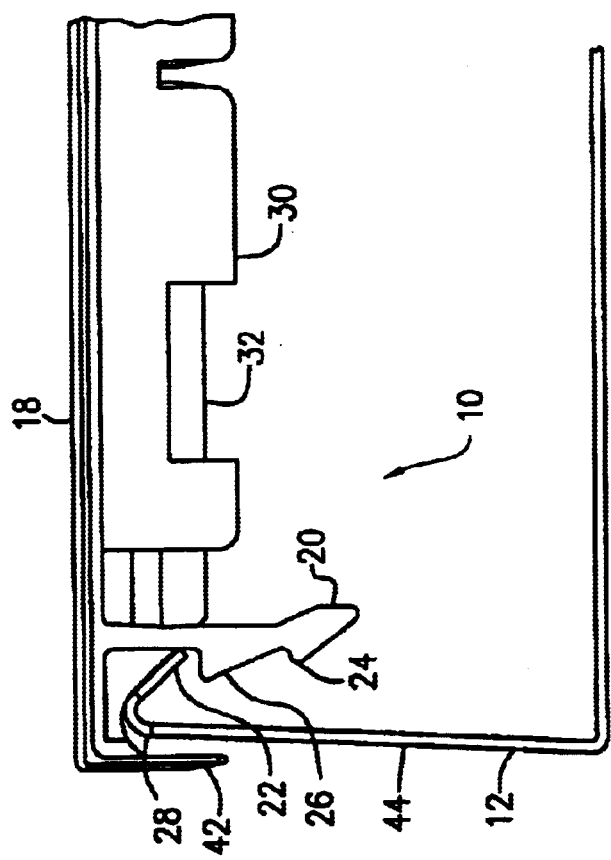
FIG. 4 is a sectional view of the invention showing its full attachment position onto a surface raceway.
Figure 3:
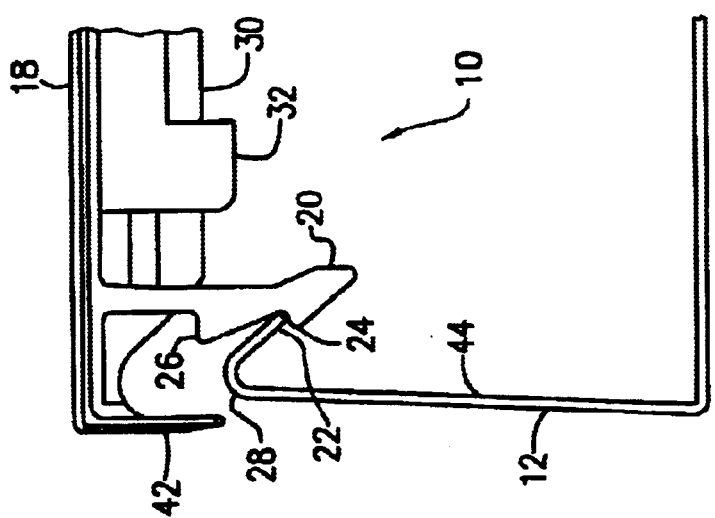
FIG. 3 is a sectional view of the invention showing its position prior to full attachment to the surface raceway.

In the embodiment shown and described herein, mounting bracket 18 is secured to surface raceway 10 via one or more latches 20 which extend from bracket 18. These laches 20 are configured to engage and mate with corresponding catch 22 on base 12 of surface raceway 10. As shown in FIGS. 3 and 4, latch 20 is configured to engage its respective catch 22 in at least two different locations along the length of latch 20. The first stop 24 of latch 20 is configured for only temporary securement of bracket 18 to base 12 while the second stop 26 will more permanently mount bracket 18 to base 12.

Catch or lip 22 is shown as consisting of an in-turned edge 28 of one of the outer walls of base 12, but catch 22 can also be configured as an enlarged portion of base 12. Other arrangements of catch 22 are also within the contemplation of this invention so long it provides a surface against which stops 24 and 26 can engage. Catch 22 is also oftentimes the same component or feature of base 12 to which cover 14 is secured.

In the embodiment shown, a latch 20 extends from the back side or surface 30 of bracket 18 from each of the four respective corner regions of bracket 18. However, this need not necessarily be the case as latches 20 can also extend from other regions of bracket 18 and it is equally likely that there will only be a single latch (or a series of individual latches) extending from the top and/or bottom sides of mounting bracket. Also, it is within the contemplation of this invention that latch 20 can be wider than its extended length. Hence, one or more latches 20 can run along all or a portion of mounting bracket 18 parallel with the longitudinal run of base 12. No matter what its configuration may be, each latch 20 needs to extend from under or back side 30 so that it can engage its corresponding catch or lip 22 of base 12. Underside 30 of mounting bracket 18 (i.e. opposite the front or visible side when mounting bracket 18 is fully installed) is also configured with appropriate stiffeners or other supports 32 so as to impart strength and rigidity to bracket 18.

It is also within the contemplation of this invention to devise mounting bracket 18 with a single elongated latch 20 (or a plurality of individual latches 20) projecting from one region, for example a top region, of mounting bracket 18 so as to engage its/their corresponding portion of base 12. The opposite region of mounting bracket 18 (i.e. the bottom region in this example) would then be configured with a locking mechanism (such as a latch with only a single stop 26 therein) that would lock mounting bracket 18 to base 12. Alternatively, this bottom region of mounting bracket 18 may contain only a single latch 20 or a different number of latches 20 than are located along the corresponding top region of mounting bracket 18.

Figure 2:
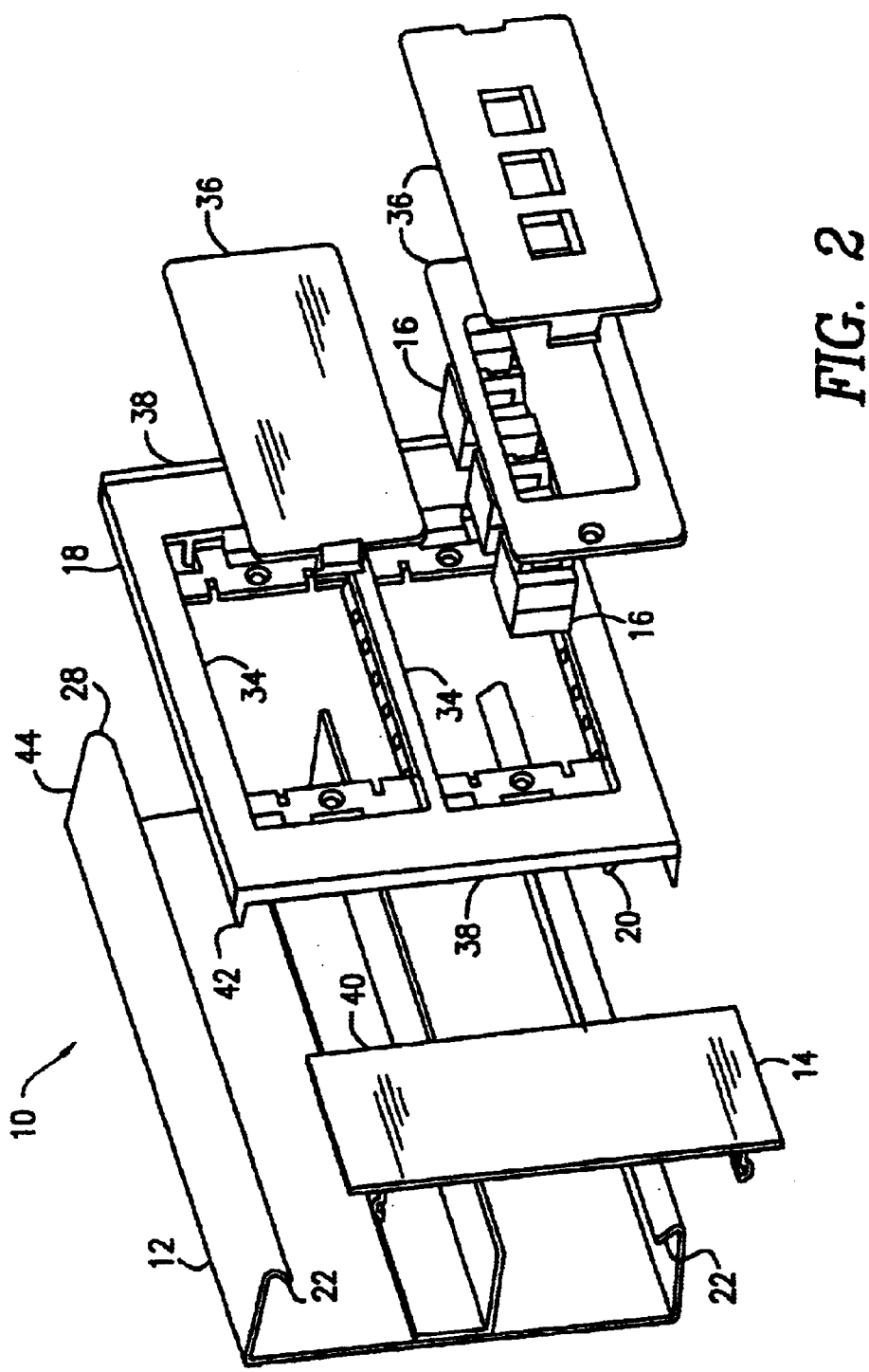
FIG. 2 is a perspective view of the invention in a dis-assembled or exploded state prior to attachment to a surface raceway (with the surface raceway covering shown in this view).

Mounting bracket 18 is further configured with one or more openings 34 sized to accept electrical fixture 16 therein. As shown, regions next to or adjacent opening 34 can be designed to support both electrical fixture 16 and faceplate 36. In some circumstances, such as when installing a duplex outlet, fixture 16 would most likely be secured directly to mounting bracket 18 in the normal fashion via the screw openings provided. In other circumstances, such as when installing communication jacks for example, fixture 16 may instead be secured to face plate 36 which is then secured to mounting bracket 18 (see FIG. 2). There are many manners of such securement, including screws, snaps, and locking tabs; the method selected is not critical to this invention. Obviously, a variety of differently designed face plates 36 can be used (including blank) depending on the type of electrical fixture 16 to be installed (i.e. duplex receptacle, phone jack, etc.). Also, opening 34 is configured such that if surface raceway 10 incorporates a divider, then such opening 34 is aligned with that divided portion of surface raceway 10.

In the embodiment shown, mounting bracket 18 is configured with flange 38 on opposite sides of opening 34 that extends outwardly away from opposite sides of openings 34 so as to cover, conceal or overlay cut edge 40 of cover 14. In fact, after assembly, this cut edge 40 of cover 14 is positioned or sandwiched between flange 38 of mounting bracket 18 and base 12 of raceway 10. This is to prevent any injury that may be caused should cut edge 40 be exposed. Flanges 38 are also intended to provide the installer with some margin of error when cutting cover 14 such that cut edge 40 can be somewhat rough or angled.

Furthermore, mounting bracket 18 can be configured to apply a slight pressure or bias to the portion of cover 14 that it overlays or conceals thereby maintaining cover 14 in place. This can be accomplished by a variety of methods such as by shortening the extended length of latches 20 or by applying a deformable body to underside 30 of mounting bracket 18 that would press against or engage cover 14. While applying such pressure to cover 14 is possible, it is not necessary since mounting bracket 18 can just as easily be configured to be slightly spaced from cover 14 thereby only covering cut edge 40 so that it is not exposed.

During installation, after the type and location of electrical fixture 16 has been selected, the user will remove cover 14 from base 12 and cut or trim cover 14 accordingly. The user may then choose to either install mounting bracket 18 onto base 12 before affixing cover 14 or the user may elect to re-install cover 14 before attaching mounting bracket 18. In either event, the user pushes bracket 18 onto base 12 until first set of stops 24 engage catch 22. Once both bracket 18 and cover 14 are thusly installed, adjustments can be made to insure that newly cut edge 40 of cover 14 is underneath its corresponding flange 38 of bracket 18 (such as by sliding or further positioning cover 14 with respect to bracket 18). Should further trimming of cover 14 be needed, this can be accomplished by simply removing it from base 12, make the necessary cut and then re-assembly cover 14 to base 12. It is also possible to remove mounting bracket 18 from base 12 during this operation if such is desired.

It should be noted that the extension of latches 20 from underside 30 and the securement of latches 20 to their corresponding catch 22 helps prevent cover 14 from interfering with electrical fixture 16. In other words, latches 20 by their extension into base 12, act as a stop that blocks cover 14 from sliding too far underneath flange 38 of bracket 18 so as to prevent cut edge 40 from interfering with electrical fixture 16 or its associated wiring. Alternatively, mounting bracket 18 may be configured with additional stiffeners 32 on underside 30 that serve as cover stops.

It is also at this stage, when mounting bracket 18 is only temporarily secured to base 12, that the wiring of electrical fixture 16 can commence. Upon such wiring, face plate 36 is mounted and then the entire bracket 18 with fixture 16 can be further pushed into base 12 till stop 26 engages catch 22. This is the final assembly stage since bracket 18 will now fully cover cut edges 40 on opposite sides of opening 34. Bracket 18 is also configured to cover any opening into base 12 along the other two sides of opening 34 that had been previously covered by cover 14.

Figure 5:
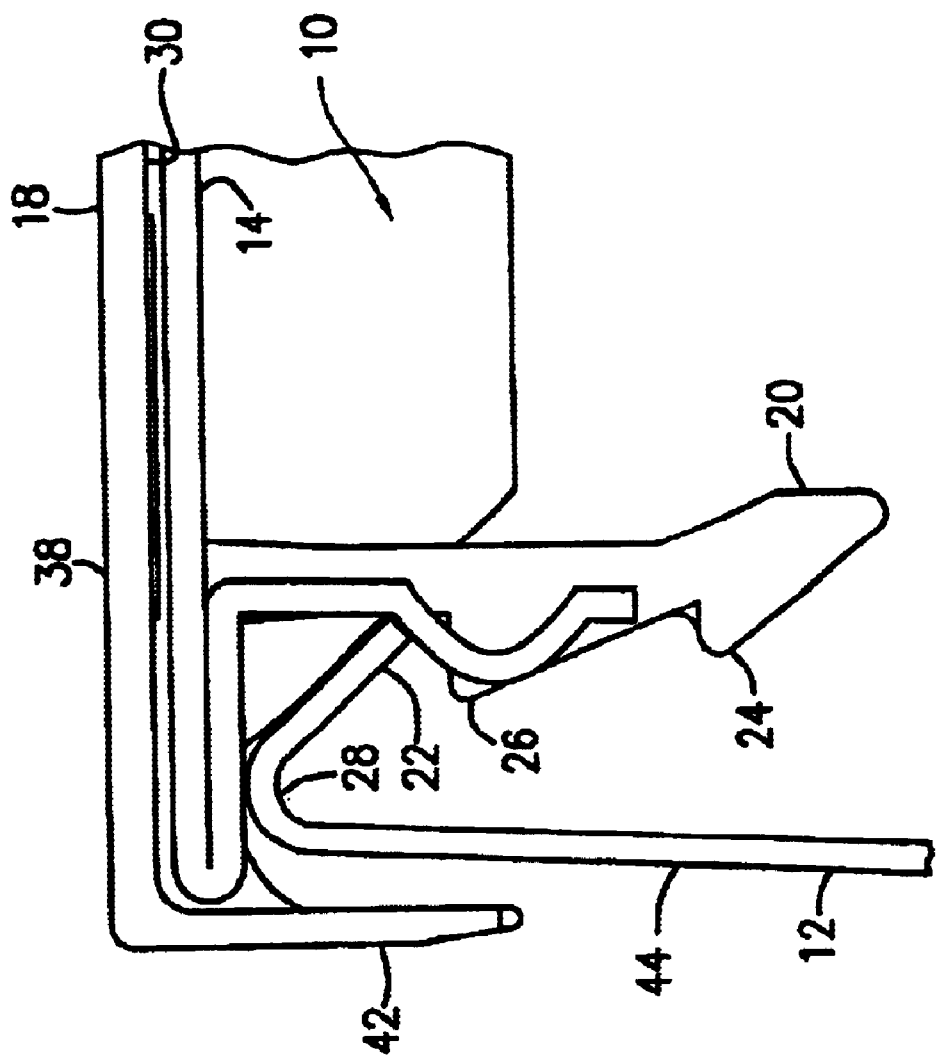
FIG. 5 is a sectional view of the invention showing the cover intermediate the mounting bracket and the surface raceway base component.

As noted more fully in FIGS. 3, 4 and 5, bracket 18 is also configured with rim 42 that extends along a portion of sidewall 44 of base 12 but is spaced therefrom. The spacing of this rim 42 from sidewall 44 is designed so as to accommodate a portion of cover 14 therein. In other words, while flange 38 will overlap or conceal cut edge 40 and its adjacent cover portion, rim 42 does the same thing but along sidewall 44 rather than across the open side of base 12.

While the above description has been provided with respect to the embodiment shown, other advantageous properties of this invention will be apparent to those skilled in the art and to those who have experience of this invention. These advantages are intended to also be included and incorporated herein. Thus, the scope of this invention should be determined not by the embodiment illustrated or described, but by the appended claims and their legal equivalents.

What is claimed is:

1. An assembly for mounting an electrical fixture to a surface raceway having base and cover components comprising:
    (a) a mounting bracket having front and back surfaces and configured to support an electrical fixture therein;
    (b) at least one latch extending from said back surface and configured to engage and latch onto the base component of the surface raceway; and,
    (c) a portion of said mounting bracket configured to overlay a portion of the cover component of the surface raceway.

2. The assembly as set forth in claim 1 wherein said mounting bracket is of unitary construction.

3. The assembly as set forth in claim 1 wherein said latch is configured with at least two stops, one for temporarily securing said bracket to the base component and another for more permanent securement of said bracket to the base component.

4. The assembly as set forth in claim 1 wherein a said latch extends from each of the corner regions of said mounting bracket.

5. The assembly as set forth in claim 1 wherein said latch engages the same mechanism on the base component of the surface raceway as is used to secure the cover component of the surface raceway onto the base component.

6. The assembly as set forth in claim 1 wherein said mounting bracket is configured with at least one opening therein having adjacent regions that are configured to support an electrical fixture therefrom.

7. The assembly as set forth in claim 6 further comprising a face plate secured to said mounting bracket, said face plate being configured to surround and possibly support the electrical fixture as well as cover any opening into the base component through said mounting bracket.

8. The assembly as set forth in claim 6 further comprising at least one flange adjacent said opening, said flange configured to overlay or cover a portion of said cover component.

9. An assembly for mounting an electrical fixture to a surface raceway having base and cover components comprising:
    (a) a unitary mounting bracket having a back surface and at least one opening configured to accept an electrical fixture therein;
    (b) at least one latch extending from said back surface and configured to engage and latch onto the base component of the surface raceway; and,
    (c) at least one flange adjacent said opening and configured to overlay a portion of the cover component of the surface raceway.

10. The assembly as set forth in claim 9 wherein said latch is configured with at least two stops, one for temporarily securing said bracket to the base component and another for more permanent securement of said bracket to the base component.

11. The assembly as set forth in claim 9 wherein a said latch extends from each of the corner regions of said mounting bracket.

12. The assembly as set forth in claim 9 wherein said latch engages the same mechanism on the base component of the surface raceway as is used to secure the cover component of the surface raceway onto the base component.

13. The assembly as set forth in claim 9 further comprising a face plate secured to said mounting bracket, said face plate being configured to surround and possibly support the electrical fixture as well as cover any opening into the base component through said mounting bracket.

14. The assembly as set forth in claim 9 further comprising a flange on opposite sides of said opening, said flanges extending away from said opening and configured to overlay a portion of said cover component.

15. A method of assembling an electrical fixture onto a surface raceway having base and cover components comprising the steps of:
    (a) securing a mounting bracket having front and back sides to the base component of the surface raceway via at least one latch extending from said back side, each said latch configured to engage and latch onto the base component;
    (b) mounting the electrical fixture to said mounting bracket;
    (c) positioning a portion of the cover component intermediate the base component and said bracket.

* * * * *